UNITED STATES PATENT OFFICE.

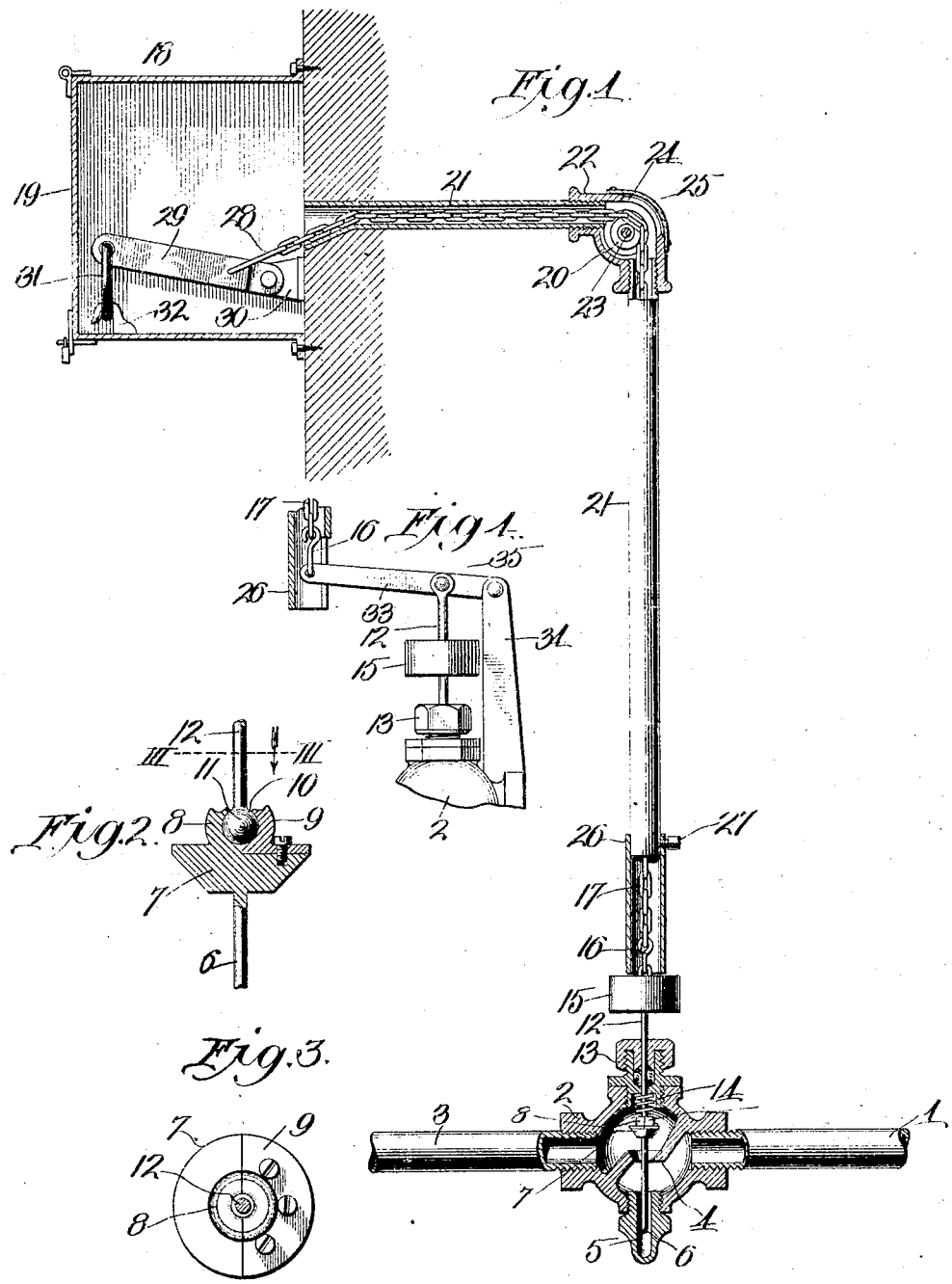

HENRY SIEBEN, OF KANSAS CITY, MISSOURI, ASSIGNOR OF ONE-FOURTH TO L. E. WYNE AND ONE-FOURTH TO A. H. GLASNER, OF KANSAS CITY, MISSOURI.

FLUID-CONTROLLING APPARATUS.

938,613.     Specification of Letters Patent.     Patented Nov. 2, 1909.

Application filed February 3, 1909. Serial No. 475,915.

*To all whom it may concern:*

Be it known that I, HENRY SIEBEN, a citizen of the United States, residing at Kansas City, in the county of Jackson and State of Missouri, have invented certain new and useful Improvements in Fluid-Controlling Apparatus, of which the following is a specification.

This invention relates to fluid-controlling apparatus for use in a building, the special object being to produce apparatus controllable from the inside or outside of the building, according to location, the character of the fluid determining the location of such means; a further object being to produce apparatus of the character outlined of simple, strong, durable and inexpensive construction, and which can be easily, expeditiously and economically installed.

With this general object in view and others as hereinafter appear, the invention consists in certain novel and peculiar features of construction as hereinafter described and claimed; and in order that it may be fully understood reference is to be had to the accompanying drawing, in which;

Figure 1. is a sectional view of a part of a building equipped with apparatus embodying my invention, shown partly in elevation and partly in section. Fig. 2, is an enlarged section of the valve. Fig. 3, is a horizontal section on the line III—III of Fig. 2. Fig. 4, is a view showing a part of the apparatus of modified construction.

In the said drawing, 1 indicates the gas pipe leading from the main, not shown, to a valve casing 2, and 3 is the house-pipe leading from the opposite side of the casing.

4 indicates the perforated diaphragm of the valve arranged between pipes 1 and 3 and below the diaphragm is a removable cup 5, wherein projects and is capable of reciprocating and moving laterally to a slight extent, the rigid depending stem 6 of the valve 7. The valve is formed at its upper side with a projection 8 which in conjunction with the semi-circular cap 9 forms a socket 10, for the ball 11 at the lower end of the stem extension 12, said extension extending slidingly up through the stuffing-box 13. For holding the valve yieldingly depressed, a spring or weight or both as shown, may be provided. The spring 14 fits around stem-extension 12 and bears at its opposite ends against the stuffing-box and the socket forming portions of the valve. The weight numbered 15 is secured to the upper end of the extension 12 and pivotally attached at its upper ends is a fusible link 16 engaged with the lower end of a flexible device or chain 17. This chain may extend in a straight line into a box 18 which may be of frangible material or be equipped with a door 19 of such material, any suitable means, not shown, being employed to secure the door normally in closed position.

Ordinarily the chain will follow an irregular course instead of a straight one and in such event, I employ a grooved guide sheave 20 for engagement by the chain. The chain extends by preference through a conduit consisting of pipes 21 connected by one or more couplings 22 within which the shaft 23 of the sheave is journaled and in order to facilitate the insertion of the sheave into the coupling, the latter is provided at one side with a slot 24 of sufficient size, which slot is normally closed by a removable cover 25 secured to the coupling.

26 is a sleeve adjustably secured by a set screw 27 or its equivalent on the lower end of the conduit so that when raised access may be readily had to the chain and weight for the purpose of effecting a coupling between said elements by means of the fusible link 16, or for the purpose of replacing said link with a new one at any time, the sleeve being normally lowered nearly to the weight for the purpose of preventing any one from tampering with the fusible link. At its upper end the chain is pivotally connected by a link 28 with a lever 29 pivoted to a bracket 30, suitably secured within the box, and said lever is provided at its free end with a ring or loop 31 for detachable engagement with the hook 32 within the box. The valve is raised or unseated by swinging the lever 29 to the position shown and is secured in such position by engaging the loop or ring 31 with the hook 32 so that gas may pass freely through the valve to the house-pipe.

In the event of a fire, any one having a key may open the door 19 and free the lever and thus permit the valve to be automatically seated so as to cut off the gas supply. If a person cannot open the door, it may be broken for the same purpose. In the event that it is impossible to free lever 29, because of the fact that the building is on fire, the intense heat to which the apparatus is subjected will melt the fusible link and thus permit the valve to be automatically seated and cut off the gas supply and thus eliminate danger of an explosion or the feeding of the fire with gas. When the fire is extinguished and it is desired to resupply the building with gas, a new fusible link is substituted for that which was melted by the heat.

If desired the elevation of the valve may be effected more easily by fulcruming a lever 33 on the casing or an extension 34 thereof and connecting its opposite end to the lower end of a fusible link 16 said lever being pivotally connected at an intermediate point as at 35 to the end of rod 12 equipped with the weight 15. By connecting the valve with stem extension 12, through a ball and socket joint, the former is permitted to rock slightly in order to insure a more perfect gas-tight joint with the orifice of the diaphragm, it being obvious that through wear of the stem or stuffing-box, the valve may in time get slightly out of line with the orifice. By thus adapting the valve to accommodate itself automatically to the seat, a perfect joint with the latter is insured for the entire period of service of the valve.

From the above description it will be apparent that I have produced a gas-controlling apparatus embodying the features of advantage enumerated as desirable and I wish it to be understood that I reserve the right to make all changes falling within the spirit and scope of the appended claims.

Having thus described the invention what I claim as new and desire to secure by Letters Patent, is:—

1. In an apparatus of the character described, a pair of pipes, a valve, yielding means tending to cause the valve to close communication between the pipes, a fusible part connected to and movable with the valve, a box, a lever in said box, a flexible connection suitably guided and linked at one end to the lever and at the other end to the said fusible part, and means to secure the lever at one extremity of its movement with the valve unseated, against the resistance of said yielding means.

2. In an apparatus of the character described, a pair of pipes, a valve, yielding means tending to cause the valve to close communication between the pipes, a fusible part connected to and movable with the valve, a box, a lever in said box, a pipeway extending from said box to a point adjacent to the valve, a flexible connection suitably guided extending through the pipeway and linked at one end to the lever and at the other to the said fusible part, a sleeve adjustable on the pipeway and adapted to inclose the fusible part, and means to secure the lever at one extremity of its movement with the valve unseated, against the resistance of said yielding means.

3. In an apparatus of the character described, a pair of pipes, a valve, yielding means tending to cause the valve to close communication between the pipes, a fusible part movable with the valve, a suitably-guided flexible connection attached at its lower end to the fusible part, a box, a conduit inclosing the flexible connection embodying an elbow at a suitable point having an opening between its ends, a plate covering said opening normally, a guide sheave journaled in the elbow, adapted to be introduced therein through the said opening and forming a guide for the flexible connection, a sleeve fitting telescopically on and forming a part of the conduit and normally inclosing said fusible part, means to secure said sleeve rigidly to the conduit, and means connected to the opposite end of the connection to impart movement to the latter to open the valve.

4. In an apparatus of the character described, a valve casing, having a perforated seat, a cup below said seat, a stuffing-box above the seat, a valve above the seat provided with a stem extending downward through the valve-seat opening and into the cup, capable of reciprocatory and lateral movement, a reciprocatory rod extending through the stuffing box and having an universal-joint connection with the valve, and means for holding said valve seated with a yielding pressure.

In testimony whereof I affix my signature in the presence of two witnesses.

HENRY SIEBEN.

Witnesses:
H. C. RODGERS,
G. Y. THORPE.